United States Patent
Bostaph et al.

(10) Patent No.: US 6,727,016 B2
(45) Date of Patent: *Apr. 27, 2004

(54) DIRECT METHANOL FUEL CELL INCLUDING A WATER RECOVERY AND RE-CIRCULATION SYSTEM AND METHOD OF FABRICATION

(75) Inventors: Joseph W. Bostaph, Chandler, AZ (US); Daniel S. Marshall, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 170 days.

This patent is subject to a terminal disclaimer.

(21) Appl. No.: 09/925,948

(22) Filed: Aug. 9, 2001

(65) Prior Publication Data

US 2003/0031908 A1 Feb. 13, 2003

(51) Int. Cl.[7] .............................. H01M 8/04; H01M 8/10
(52) U.S. Cl. .............................. 429/38; 429/22; 429/30; 429/34
(58) Field of Search ........................... 429/38, 22, 34, 429/32, 30, 39, 33

(56) References Cited

U.S. PATENT DOCUMENTS 6,387,559 B1 * 5/2002 Koripella et al. ............. 429/34
6,465,119 B1 * 10/2002 Koripella et al. ............. 429/32
6,497,975 B2 * 12/2002 Bostaph et al. ........... 429/34 X

FOREIGN PATENT DOCUMENTS

| DE | 1902219 C1 | 6/2000 |
| WO | WO 99/27590 | 6/1999 |
| WO | WO 02/49136 A2 | 6/2002 |

* cited by examiner

Primary Examiner—John S. Maples
(74) Attorney, Agent, or Firm—William E. Koch

(57) ABSTRACT

A fuel cell device and method of forming the fuel cell device including a base portion having a major surface. At least one fuel cell membrane electrode assembly is formed on the major surface of the base portion. A water recovery and recirculation system is defined in a cap portion and in communication with a water recovery and recirculation channel defined in the base portion. The water recovery and recirculating system is formed to collect reaction water from the cathode side of the at least one fuel cell membrane electrode assembly for recirculation to the anode side of the fuel cell membrane electrode assembly. An exhaust separation chamber is defined in the base portion and communicating with the fuel cell membrane electrode assembly for the exhausting of generated gases.

22 Claims, 3 Drawing Sheets

DIRECT METHANOL FUEL CELL INCLUDING A WATER RECOVERY AND RE-CIRCULATION SYSTEM AND METHOD OF FABRICATION

FIELD OF INVENTION

The present invention pertains to fuel cells, and more particularly to a direct methanol fuel cell including a water recovery and recirculation system and a method of fabricating the system, in which water is collected and recirculated during the process of generating electrical energy.

BACKGROUND OF THE INVENTION

Fuel cells in general, are "battery replacements", and like batteries, produce electricity through an electrochemical process without combustion. The electrochemical process utilized provides for the combining of protons with oxygen from air or as a pure gas. The process is accomplished utilizing a proton exchange membrane (PEM) or proton conducting membrane sandwiched between two electrodes, namely an anode and a cathode. Fuel cells, as known, are a durable provider of electricity. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode), and the cathode side (second electrode) is exposed to forced or ambient air (or O2). A proton conducting membrane, such as a Nafion® type proton conducting membrane, typically separates the anode and the cathode sides. Several of these fuel cells can be electrically connected in series or parallel depending on voltage or power requirements.

Typically, DMFC designs are large stacks with forced airflow at elevated temperatures. Smaller air breathing DMFC designs are more complicated. In conventional PEM fuel cells, stack connections are made between the fuel cell assemblies with conductive plates, machined with channels or grooves for gas distribution. A typical conventional fuel cell is comprised of an anode ($H_2$ or methanol side) current collector, anode backing, membrane electrode assembly (MEA) (anode/ion conducting membrane/cathode), cathode backing, and cathode current collector. Each fuel cell is capable of producing approx. 1.0 V. To obtain higher voltages, fuel cells are typically stacked in series (bi-polar manner—positive to negative) one on top of another. Conventional fuel cells can also be stacked in parallel (positive to positive) to obtain higher current, but generally larger fuel cells are simply used instead.

During operation of a direct methanol fuel cell, a dilute aqueous methanol (usually 3–4 wtwt % methanol) solution is used as the fuel on the anode side. If the methanol concentration is too high, then there is a methanol crossover problem that will greatly reduce the efficiency of the fuel cell. If the methanol concentration is too low then there will not be enough fuel on the anode side for the fuel cell reaction to take place. Current large DMFC stack designs utilize forced airflow. The smaller air breathing DMFC designs are difficult to accomplish because of the complexity in miniaturizing the system for portable applications.

Carrying the fuel in the form of a very dilute methanol mixture would require carrying a large quantity of fuel which is not practical for the design of a miniature power source for portable applications. Miniaturizing the DMFC system requires having on hand separate sources of methanol and water and mixing them in-situ for the fuel cell reaction. To aid in supplying methanol and water to the anode, it would be beneficial to recirculate the aqueous fuel mixture after the fuel cell reaction, and recycle the water generated at the cathode in the fuel cell reaction, as well as the water arriving at the cathode via diffusion and electro-osmotic drag.

Accordingly, it is a purpose of the present invention to provide for a direct methanol fuel cell system design in which a water management system is integrated into a miniaturized device.

It is a purpose of the present invention to provide for a direct methanol fuel cell including a water management system, comprised of microchannels, cavities, hydrophobic/hydrophilic treatments, and microfluidics technology for fuel-bearing fluid mixing, pumping and recirculation of water by-product production.

It is still a further purpose of the present invention to provide for a direct methanol fuel cell including a water management system in which all of the system components are either embedded inside a base portion, or positioned adjacent a base portion, such as a ceramic base portion.

It is yet a further purpose of the present invention to provide for method of fabricating a direct methanol fuel cell including a water management system, comprised of microchannels, cavities, chemical surface modifications, and microfluidics technology for fuel-bearing fluid mixing, pumping and recirculation of water by-product production.

SUMMARY OF THE INVENTION

The above problems and others are at least partially solved and the above purposes and others are realized in a fuel cell device and method of forming the fuel cell device including a base portion, formed of a singular body, and having a major surface, and a cap portion. At least one membrane electrode assembly (MEA) is formed on the major surface of the base portion. The membrane electrode assembly is in communication with a stream of forced air. The forced air is passed over the cathode through a flow field formed in the cap portion. Oxygen in the air is utilized by the MEA to generate electricity, and the water byproduct formed at the cathode, the water and methanol which diffused through the membrane, is carried away by the stream of forced air, thus exiting across the MEA as a combination of air, oxygen depleted air, or remaining oxygen, water, and possibly methanol. The stream of forced air subsequently enters an gas-liquid separator. The air exits the separator through a hydrophobic membrane, while the water is re-introduced into a recirculating channel defined in the base portion. The recirculating channel is spaced apart from the fluid supply channel for re-introducing by-product fluid/water, from the at least one membrane electrode assembly. A fluid supply channel is defined in the base portion and communicates with the at least one membrane electrode assembly for supplying a fuel-bearing fluid to the at least one membrane electrode assembly. The membrane electrode assembly including the base portion and the cap portion form a single fuel cell assembly.

BRIEF DESCRIPTION OF THE DRAWINGS

Referring to the drawings.

DESCRIPTION OF THE PREFERRED EMBODIMENT

Water management is critical for all polymer electrolyte membrane (PEM) fuel cells. The importance of keeping the reaction surface from forming a water barrier layer, or flooding, thus reducing reaction kinetics, is critical. It is also critical to keep the membrane well hydrated for high proton conductivity. Liquid water production is, among other things, pressure, temperature, and current dependent. In the prior art, liquid water removal is largely done through temperature gradient (2-phase), hydrophobic treatments, micro/macro porous diffusion backings, and evaporation from convective air flow. It is disclosed in the present invention to provide for water management of a fuel cell device that includes a means for water management including a forced stream of air in communication with an gas-liquid separator and an exhaust channel. More particularly a forced stream of air is utilized to remove/redirect liquid water accumulation from the cathode side of the fuel cell device. After accumulation, the water is re-introduced/re-circulated back to the anode side of the fuel cell device for reaction and dilution of the methanol stream.

Figure 1:
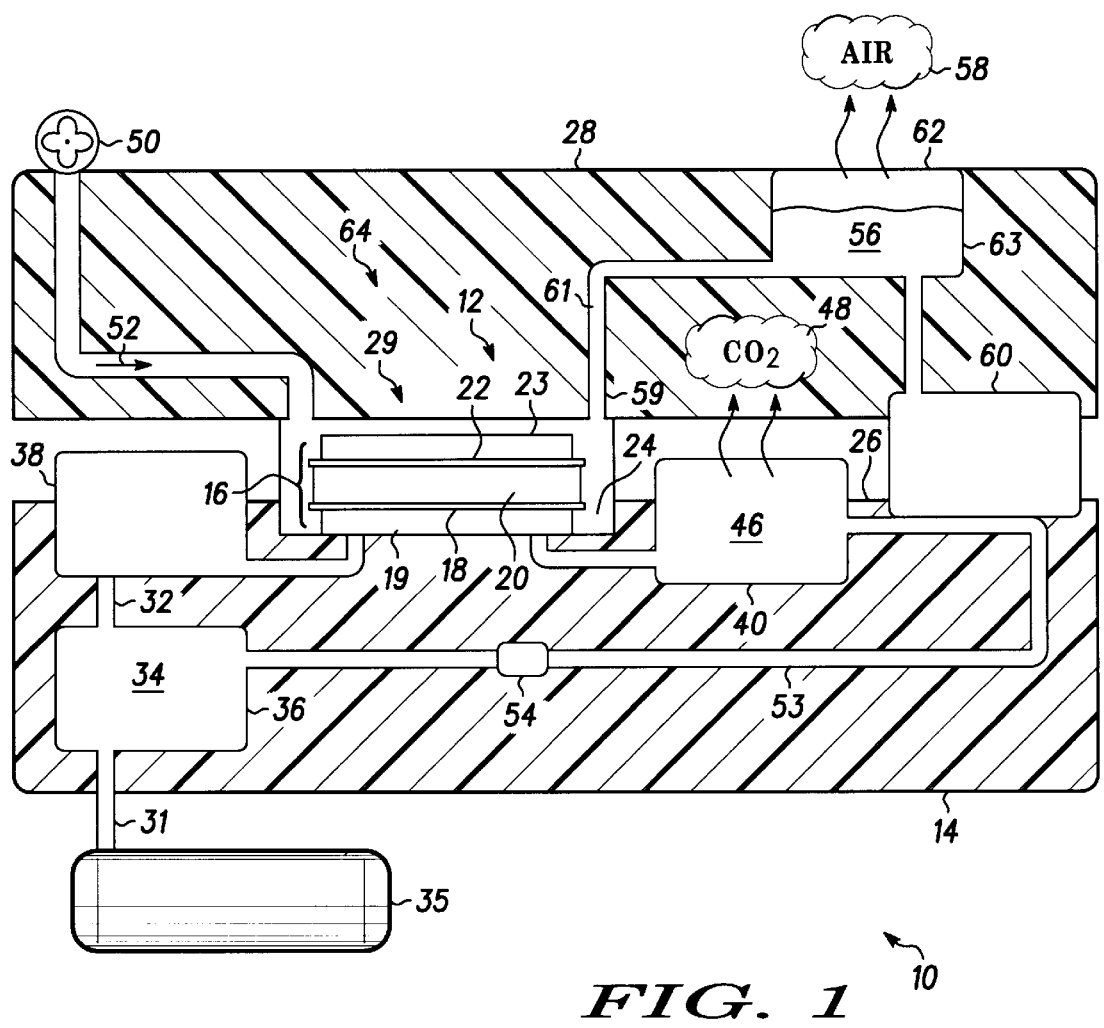
FIG. 1 is a simplified sectional view of a direct methanol fuel cell device including a water management system, according to the present invention.

Turning now to the drawings, FIG. 1 illustrates in simplified sectional view a direct methanol fuel cell including a water management system fabricated according to the present invention. Illustrated is a fuel cell system, generally referenced 10, including a single fuel cell assembly 12. Fuel cell assembly 12 is formed on a base portion 14. Base portion 14 is designed to be impermeable to the mixture of fuel and oxidizer materials that is utilized to power fuel cell assembly 12. Typically a hydrogen-containing fuel/oxidizer mixture is utilized to power fuel cell assembly 12. Suitable fuels that are consumed by fuel cell assembly 12 to produce electrical energy are hydrogen-containing materials including hydrogen, methane and methanol. In this particular example, methanol is the fuel for fuel cell assembly 12. Base portion 14 is typically formed of glass, plastic, silicon, graphite, metal, ceramic, or any other suitable material. In this particular embodiment, fuel cell system, or planar stack, 10 is composed of a single direct methanol fuel cell assembly 12 defined by a fuel cell membrane electrode assembly (MEA) (discussed presently).

Base portion 14 has formed within it, a plurality of micro-fluidic channels as illustrated. More particularly, base portion 14 has formed within it a fluid inlet 31, in fluidic communication with mixing chamber 36. Mixing chamber 36 is in fluidic communication with a fluid supply channel 32. Fluid supply channel 32 is formed in base portion 14 utilizing standard techniques, well known in the art, such as multi-layer ceramic technology, micro-machining, or injection molding. Fluid supply channel 32 supplies a fuel-bearing fluid 34 to fuel cell assembly 12. In this particular example, fuel-bearing fluid 34 is comprised of methanol being delivered directly from a fuel tank 35 and re-circulated water (discussed presently). A mixing chamber 36 is formed in base portion 14 in micro-fluidic communication with fluid supply channel 32 as illustrated. In a preferred embodiment, fuel-bearing fluid 34 is preferably 0.5 wt %–4.0 wt % methanol in water (99.5 wt %–96.0 wt %). The goal is to pump methanol into the overall assembly 10 at a rate sufficient to maintain the methanol concentration at the desired level and pump water (from the water recovery/management system discussed presently) into the assembly 12 at a rate sufficient to maintain the methanol concentration at the desired level (2 wt % to 98 wt %). The fuel cell assembly 12 would also be able to use other fuels, such as hydrogen, ethanol, or any other liquid fuel, but it should be noted that ethanol is not as efficient, nor does it produce as much power as does the use of methanol. The methanol will be pumped in at a given rate, and the water will be supplied by the integrated water management system (discussed presently), which is to be monitored by a methanol concentration sensor 38. Methanol concentration sensor 38 helps maintain the methanol percentage in the mixture. The methanol and water will be homogeneously mixed in mixing chamber 36 before flowing to fuel cell assembly 12.

During operation, anode exhaust products are separated in a carbon dioxide separation chamber 40 into a methanol depleted water/methanol mixture 46 and a carbon dioxide gas 48. Gas 48 is expelled through a gas permeable membrane (not shown) and water/methanol mixture 46 is recirculated through a recirculating channel 53, having included as a part thereof an optional pump 54, such as a MEMs-type pump, or check valve type assembly, back to mixing chamber 36. In addition, in microfluidic communication with recirculation channel 53, is a water management system (discussed presently). The water management system serves to recapture water from the cathode side of fuel cell assembly 12, and direct it toward recirculating channel 53, as illustrated.

Management and recirculation of the water/methanol mixture, subsequent to reaction in fuel cell assembly 12, and the recycling of the water diffused across the cathode (discussed presently), is required for miniaturizing the system. It is anticipated that the fuel delivery system includes solely methanol or high concentration methanol, in the form of fuel tank 35, which is to be carried in portable disposable cartridge-like devices, in fluidic communication with the base portion 14.

Fuel cell assembly 12 is comprised of a fuel cell membrane electrode assembly 16 comprised of first electrode 18, or anode, including a gas diffusion layer, such as a carbon cloth backing, 19, a film 20, such as a protonically conducting electrolyte membrane, and a second electrode 22, or cathode, including a gas diffusion layer, such as a carbon cloth backing, 23. First and second electrodes 18 and 22 are comprised of a material selected from the group consisting of platinum, palladium, gold, nickel, tungsten carbide, ruthenium, molybdenum, and alloys or compounds of platinum, palladium, gold, nickel, tungsten carbide, molybdenum, ruthenium, or any other suitable catalyst material. In a preferred embodiment, film 20 is further described as formed of a Nafion® type material that largely prevents the permeation of fuel from the anode side (first electrode 18) to the cathode side (second electrode 22) of fuel cell assembly 12.

Membrane electrode assembly 16 in this particular example is positioned in a recess 24 formed in an uppermost major surface 26 of a base portion 14. It is anticipated by this disclosure that membrane electrode assembly 16 can be positioned on major surface 26 of base portion 14 without the need for the formation of recess 24. In this instance, a spacer (not shown) would be utilized to avoid complete compression of membrane electrode assembly 16 between base portion 14 and cap portion 28.

Planar slack array 10 further includes a cap portion 28 having formed therein a water recovery and recirculation system 64. Water recovery and recirculating system 64 includes a forced air system, provided by an air supplier 50, which provides for en excited force, thereby allowing far ambient air to be forced through flow field 29. Air supplier 50 is disclosed as being formed as an air pump, such as a piezoelectric pump, a diaphragm pump, a peristolic pump, a rotary air pump, or the like. In addition, it is anticipated by this disclosure that air supplier 50 is an electric fan, or the like. During operation, air supplier 50 supplies a forced stream of ambient air 52 through flow field 29. Forced stream of air 52 flows over cathode 22 supplying oxygen to fuel cell assembly 12 thereby providing for the electro-chemical fuel cell reaction and production of electricity. This forced stream of air 52 across cathode 22 provides for water 59 accumulated on cathode 22 to be curried away in an exit flow stream 61. Exit flow stream 61 enters a gas-liquid separator tank 58 where it is separated into remaining air 58 and remaining water 63. Gas-liquid separator tank 56 is disclosed as being comprised of an air permeable membrane 62 that is hydrophobic, thus providing for the exit there-through of remaining air 55 that was not utilized by fuel cell assembly 12. Remaining water 63 is collected in the gas-liquid separator tank 56 and returned to the recirculating channel 53 through a membrane such as a reverse osmosis type membrane 60 and ultimately to the anode fuel side of fuel cell assembly 12. It is anticipated by this disclosure, the addition of a solute to fuel bearing fluid 34 that does not react at the anode 18, but in creases osmotic flow of water through reverse osmosis type membrane 60. It is also anticipated to include an active valve (not shown) between reverse osmosis type membrane 60 and gas-liquid separator tank 56. It should be understood that the collected water 63 may include methanol fuel which has passed through membrane electrode assembly 16 during operation. Subsequent to accumulation of the water 63 in the water/separator tank 56, water 63 is fed back to the anode side of fuel cell assembly 12 through water recovery return channel 53 for reaction and dilution of the methanol stream.

This type of water management system while eliminating cathode flooding, increases the power consumed over a passive system by the power required of air supplier 50. Concurrently, the system allows for an easier and more complete collection, thus re-introduction of the cathode water over a passive system. The miniaturization of elements allows for the collection and reintroduction of water in a smaller area. Unlike forced typical forced air systems, the device disclosed herein is orientation insensitive.

During fabrication, fuel cell membrane electrode assembly 16 is formed using a hot press method, or other standard method known in the art. More particularly, first electrode 18 is formed or positioned in contact with base portion 14. Various materials are suitable for the formation of electrode 18. Suitable materials include platinum, palladium, gold, nickel, tungsten carbide, ruthenium, molybdenum, various alloys or compounds of these materials, or any other suitable catalyst material.

In this specific embodiment, and for exemplary purposes, first electrode 18 has a dimension of approximately 2.0 cm×2.0 cm. When planar stack 10 includes a plurality of fuel cell assemblies 12 (not shown), there is included a separation of approximately 0.01 mm to 1 mm between adjacent fuel cell assemblies 12. It should be understood that dependent upon the required power output, any number of fuel cell assemblies 12 and any measurement of distance between fuel cell assemblies 12, can be fabricated to form a planar array of fuel cells, from one single fuel cell, to numerous fuel cells.

Film 20, formed of a protonically conducting electrolyte, also referred to as a proton exchange membrane (PEM), is comprised of a Nafion® type material. Film 20 as previously stated serves to limit the permeation of fuel-bearing fluid 34 from the anode 18 of fuel cell assembly 12 to the cathode 22 of fuel cell assembly 12.

Next, during fabrication of membrane electrode assembly 16, a second electrode 22 is formed to be correspondingly cooperating with first electrode 18. Second electrode 22 is formed having approximately the same dimension as its corresponding first electrode 18. It should be understood, that as described, fuel cell membrane electrode assembly 16 is comprised of first electrode 18, film 20, second electrode 22, and gas diffusion media layers, or more particularly gas diffusion layers, or carbon cloth backing layers, 19 and 23.

Figure 2:
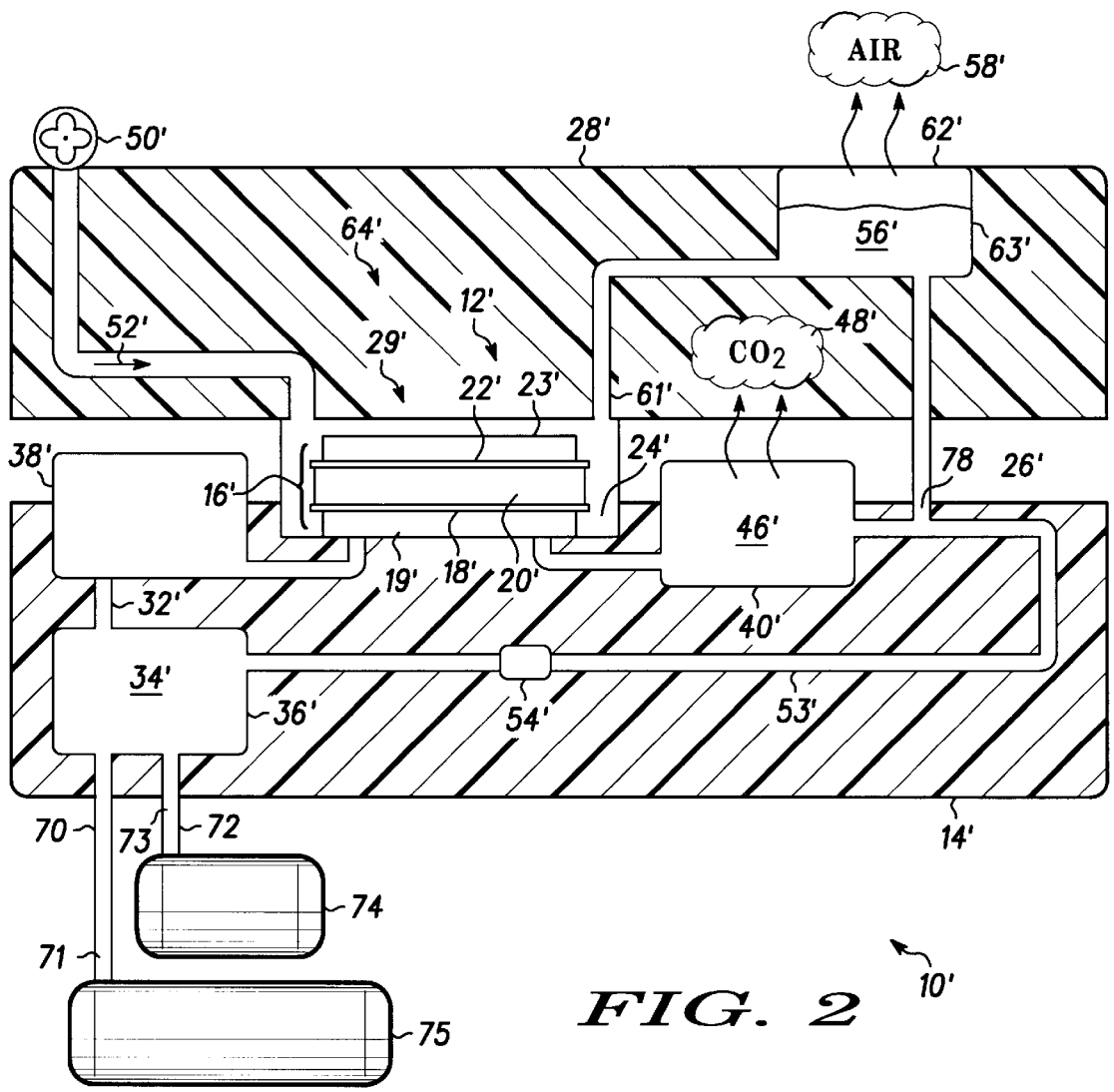
FIG. 2 is a simplified schematic diagram illustrating the fuel cell device including a water management system of the present invention.

Referring now to FIG. 2, illustrated is an alternative embodiment of a fuel cell, generally referenced 10'. It should be noted that all components of the first embodiment as illustrated in FIG. 1, that are similar to components of this particular embodiment as illustrated in FIG. 2, are designated with similar numbers, having a prime added to indicate the different embodiment.

Fuel cell assembly 12' is formed on a base portion 14'. Base portion 14' as described with respect to FIG. 1, is also designed to be largely impermeable to the mixture of fuel and oxidizer materials that is utilized to power fuel cell assembly 12'. In this example, methanol is used to fuel, fuel cell assembly 12'. Planar stack 10' is composed of a single direct methanol fuel cell assembly 12' defined by a fuel cell membrane electrode assembly (MEA) (discussed presently).

Base portion 14' has formed within it a plurality of micro-fluidic channels as illustrated. More particularly, base portion 14' has formed within it a first fluid inlet 70 in and a second fluid inlet 72, in fluidic communication with a mixing chamber 36'. Mixing chamber 36' is in fluidic communication with fluid supply channel 32'. Fluid supply channel 32' are formed in base portion 14' utilizing standard techniques, well known in the art, such as multi-layer ceramic technology, micro-machining, or injection molding. First fluid inlet 70 supplies fuel 71 to a mixing chamber 36'. In this particular example, fuel 71 is comprised of methanol delivered directly from a methanol tank 75. Second fluid inlet 72 supplies water 73 to a mixing chamber 36', more particularly, water being delivered directly from a water tank 74. Mixing chamber 36' is formed in base portion 14' in micro-fluidic communication with fluid supply inlets 70 and 72, and fluid supply channel 32', and a recirculating channel 53'. In a preferred embodiment, mixing chamber 36' mixes fuel 71, water 73, and water/methanol mixture 46' thereby forming fuel-bearing fluid 34' which is preferably 0.5 wt %–4.0 wt % methanol in water (99.5 wt %–96.0 wt %). The goal is to pump methanol and water into the overall assembly 12' at a rate sufficient to maintain the methanol concentration at the desired level. The fuel cell assembly 12' would also be able to use other fuels, such as hydrogen, ethanol, or any other liquid fuel, but it should be noted that they are not as efficient, nor do they produce as much power as does the use of methanol. In this particular example a separate methanol tank 75 and water tank 74 are utilized to supply the fuel-bearing fluid 34'. During operation, methanol 71 will be pumped in at a given rate, and the water 73 will be added as needed determined by the efficiency of the integrated water management system (discussed presently), which is to be monitored by a methanol concentration sensor 38'. Methanol concentration sensor 38' helps maintain the methanol percentage in the mixture. The methanol, water and recirculated water/methanol mixture 46' will be homogeneously mixed in mixing chamber 36', thereby forming fuel-bearing fluid 34' before flowing to fuel cell assembly 12'. It should be understood that an initial supply of water 73 to fuel-bearing fluid 34' is anticipated by this disclosure. Subsequent delivery of water to fuel-bearing fluid 34' is anticipated to be accomplished through the integrated water management system (discussed presently).

During operation, anode exhaust products are separated in a carbon dioxide separation chamber 40' into a methanol depleted water/methanol mixture 46' and a carbon dioxide gas 48'. Gas 48' is expelled through a gas permeable membrane (not shown) and methanol depleted water/methanol mixture 46' is recirculated through a recirculating channel 53', having included as a part thereof an optional pump 54', such as a MEMs-type pump, or check valve type assembly, back to mixing chamber 36'. In addition, in microfluidic communication with recirculation channel 53 is a water recovery and recirculation system (discussed presently). The water recovery and recirculation system serves to recapture water and possibly unreacted methanol from the cathode side of fuel cell assembly 12', and direct it toward re-circulating channel 53', as illustrated.

As previously described, management and recirculation of the water/methanol mixture, subsequent to reaction in fuel cell assembly 12', and the recycling of the water diffused across the cathode (discussed presently), is required for miniaturizing the system. It is anticipated in this particular embodiment that the fuel delivery system includes methanol 71, provided by methanol tank 75, and water 73, provided initially by water tank 75 and then subsequently, or if required, simultaneously, by the water recover and recirculation system. Methanol tank 75 and water tank 74 are to be carried in portable disposable cartridge-like devices, in fluidic communication with base portion 14'.

Fuel cell assembly 12' is comprised of a fuel cell membrane electrode assembly 16' comprised of first electrode 18', or anode, including a gas diffusion layer, such as a carbon cloth backing, 19', a film 20', such as a protonically conducting electrolyte membrane, and a second electrode 22', or cathode, including a gas diffusion layer, such as a carbon cloth backing, 23'. First and second electrodes 18' and 22' are comprised of a material selected from the group consisting of platinum, palladium, gold, nickel, tungsten carbide, ruthenium, molybdenum, and alloys or compounds of platinum, palladium, gold, nickel, tungsten carbide, molybdenum, ruthenium, or any other suitable catalyst material. Film 20' is further described as formed of a Nafion® type material that prevents the permeation of fuel from the anode side (first electrode 18') to the cathode side (second electrode 22') of fuel cell assembly 12'.

Membrane electrode assembly 16', generally similar to the embodiment of FIG. 1, is positioned in a recess 24' formed in an uppermost major surface 26' of a base portion 14'. It is anticipated by this disclosure that membrane electrode assembly 16' can be positioned on major surface 26' of base portion 14' without the need for the formation of recess 24'. In this instance, a spacer (not shown) would be utilized to avoid complete compression of membrane electrode assembly 16' between base portion 14 and cap portion 28.

Planar stack array 10' further includes a cap portion 28' having formed therein a water recover and recirculation system 64'. Water recover and recirculation system 64' includes a forced air system, provided by an air supplier 50'. Air supplier 50' is disclosed as being formed as an air pump, such as a piezoelectric pump, a diaphragm pump, a peristolic pump, a rotary air pump, or the like. In addition, it is anticipated by this disclosure that air supplier 50' is an electric fan, or the like. During operation, air supplier 50' supplies a forced stream of ambient air 52' through flow field 29'. Forced stream of air 52' flows over cathode 22' supplying oxygen to fuel cell assembly 12' thereby providing for the electrochemical fuel cell reaction and production of electricity. This forced stream of air 52' across cathode 22' provides for water accumulated on cathode 22' to be carried away in an exit flow stream 61'. Exit flow stream 61' being released back into the atmosphere, it enters a gas-liquid separator tank 56' where it is separated into remaining air 58' and remaining water 63'. Gas-liquid separator tank 56' is disclosed as being comprised of an air permeable membrane 62' that is hydrophobic, thus providing for the exit therethrough of remaining air 58'. Remaining water 63' is collected in the gas-liquid separator tank 56' and returned to the re-circulating channel 53' through a direct fluidic communication, such as a joint 78, and ultimately to anode fuel side of fuel cell assembly 12'. It should be understood that the collected water 63' may include methanol fuel which has passed through membrane electrode assembly 16' during operation. Subsequent to accumulation of water 63' in the water/separator tank 56', water 63' is fed back to the anode side of fuel cell assembly 12' through re-circulating channel 53' for reaction and dilution of the methanol stream 71.

The embodiment as shown and described with respect to FIG. 2, operates in generally the same manner as the embodiment described in FIG. 1, except in this particular embodiment, water tank 74 supplies an initial start-up supply of water, to assembly 12'. During operation, the percentage of water 73 in the fuel-bearing fuel 34' is adjusted dependent upon the amount of water recoverable from the integrated water management system 64'. In addition, in this particular embodiment, the recovered water 63' is simply pumped back to the anode side 18' of assembly 12', through a direct fluidic communication, such as joint 78 and re-circulating channel 53'.

Figure 3:
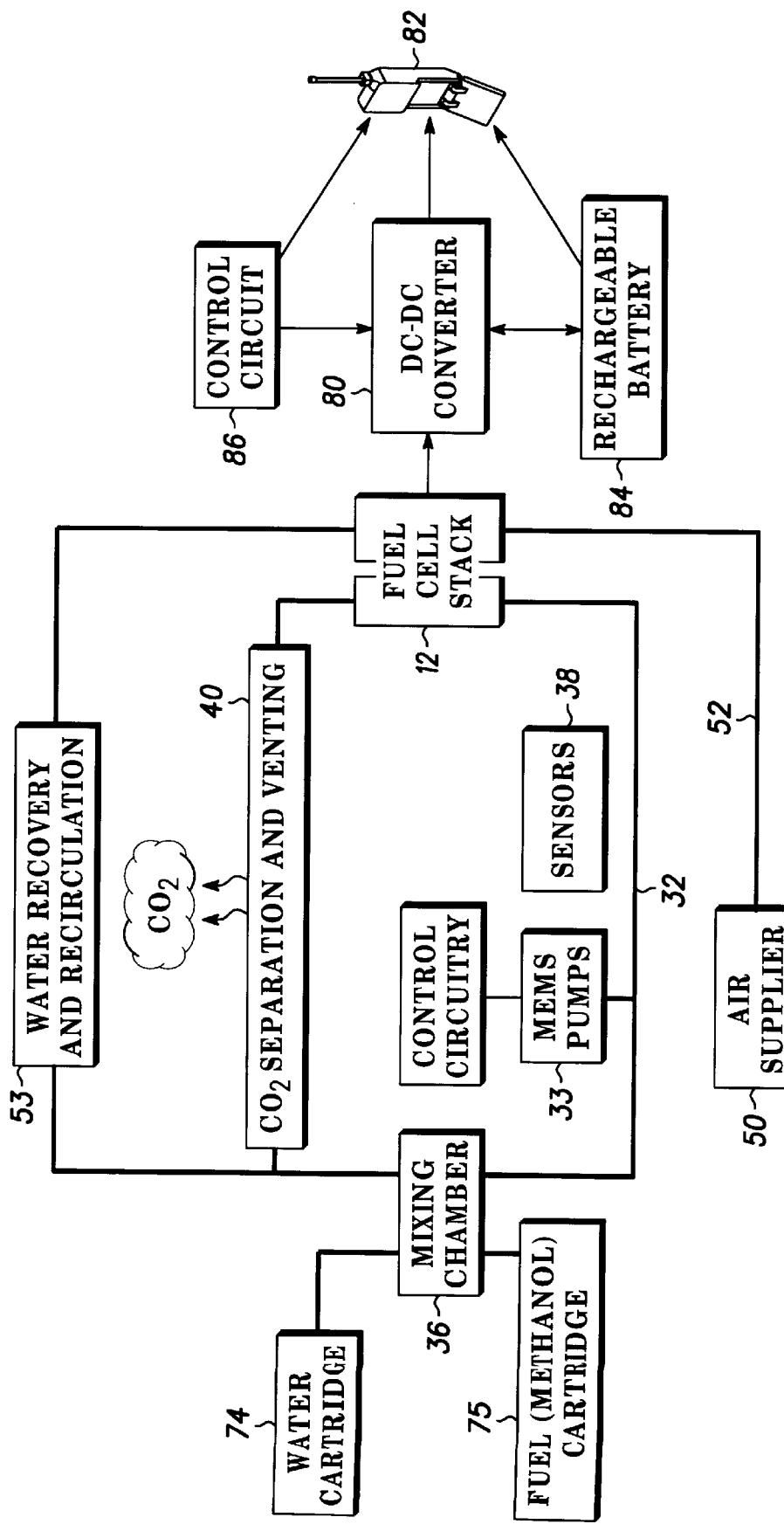
FIG. 3 is a simplified schematic diagram illustrating the fuel cell device according to the present invention.

Referring now to FIG. 3, illustrated is a simplified schematic diagram detailing the system of the present invention as shown in FIG. 2. Illustrated are methanol tank 75 and water tank 74 in microfluidic communication with mixing chamber 36. Mixing chamber 36 as previously discussed serves to achieve the proper ratio of methanol to water. Once properly mixed, the fuel-bearing fluid flows through the fluid supply channel 32 toward the fuel cell assembly 12. An optional MEMs-type pump 33 is utilized to assist with this flow. Concentration and temperature sensors 38 are provided to assist with monitoring the methanol concentration, and the temperature of the fuel-bearing fluid. The fuel-bearing fluid next reaches fuel cell stack 12 and generates power. The power is supplied to a DC—DC converter 80 which converts the generated voltage to a useable voltage for powering a portable electronic device, such as a cell phone 82 and included as a part thereof a rechargeable battery 84 and control circuitry 86. During operation a forced air stream 52 is supplied by an integrated water recovery and recirculation system 64. Water 63 is recovered from the cathode side of the fuel cell assembly 12 by the forced air stream 52 and separated from the air in an gas-liquid separator chamber 58, as part of integrated water recovery and recirculation system 64. Water 63 is then recirculated through a recirculating channel 53 back to the mixing chamber 36. This recirculating of fluid provides for the consumption of less water from water tank 74 and thus less replenishment of water tank 74, or alternatively, provides for the elimination of water tank 74.

Accordingly, disclosed is a fuel cell system including an integrated water recovery and recirculation system and method of fabrication which provides for the fabrication of the system, providing for inclusion of a single fuel cell or a plurality of fuel cells to be formed on a planar surface, thus allowing higher voltages and currents to be gained on a single planar surface. More particularly, the design provides for a simplified system in which water generated on the cathode side of the fuel cell assembly is collected in a forced air stream and recirculated back to the mixing chamber through a re-circulating channel, thereby providing for less consumption and replenishment of a water supply. In addition, it is disclosed that the system of the present invention is a semi-self contained system, and is not orientation sensitive, thus providing for ease in moving the system, such as when providing power to a portable electronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell device comprising:
   a base portion, formed of a singular body, and having a major surface;
   at least one fuel cell membrane electrode assembly formed on the major surface of the base portion;
   a water recovery and recirculating system positioned to recover reaction water from the at least one fuel cell membrane electrode assembly;
   a fluid supply channel defined in the base portion and communicating with the at least one fuel cell membrane electrode assembly, the fluid supply channel including a mixing chamber and at least one fuel-bearing fluid inlet;
   a water recovery and recirculation channel defined in the base portion and communicating with the at least one fuel cell membrane electrode assembly, the water recovery and recirculation channel in communication with the water recovery and recirculating system;
   an exhaust separation chamber spaced apart from the fluid supply channel for exhausting gases from the at least one fuel cell membrane electrode assembly, in combination, the at least one fuel cell membrane electrode assembly, the water recovery and recirculating system, the cooperating fluid supply channel, the water recovery and recirculation channel and the cooperating exhaust separation chamber forming a single fuel cell system;
   a plurality of electrical components formed in the base portion for electrical integration of the fuel cell assembly.

2. A fuel cell device as claimed in claim 1 wherein the base portion comprises a material selected from the group consisting of ceramic, plastic, glass, metal, and silicon.

3. A fuel cell device as claimed in claim 2 further wherein the at least one fuel cell membrane electrode assembly formed on the major surface of the base portion includes a plurality of fuel cell membrane electrode assemblies formed on the major surface of the base portion wherein each of the plurality of fuel cell membrane electrode assemblies is spaced at least 0.01 mm from an adjacent fuel cell membrane electrode assembly.

4. A fuel cell device as claimed in claim 1 wherein the fuel cell membrane electrode assembly further includes a first electrode, a film adjacent the first electrode, formed of a protonically conductive electrolyte, and a second electrode in contact with the film.

5. A fuel cell device as claimed in claim 4 wherein the fuel cell membrane electrode assembly further includes a gas diffusion layer positioned on the first electrode on a side opposite the adjacent film, and a gas diffusion layer positioned on the second electrode on a side opposite the adjacent film.

6. A fuel cell device as claimed in claim 5 wherein the water recovery and recirculating system includes an air supplier, characterized as generating a forced air stream across the fuel cell membrane electrode assembly.

7. A fuel cell device as claimed in claim 6 wherein the water recovery and recirculating system further includes an gas-liquid separator tank in fluidic communication with the forced air stream and the water recovery and recirculating channel and mixing chamber.

8. A fuel cell device as claimed in claim 7 wherein the water recovery and recirculating system further includes a reverse osmosis type membrane in fluidic communication with the air water separator tank and the water recover and recirculating channel.

9. A fuel cell device as claimed in claim 7 wherein the water recovery and recirculating system further includes a direct fluidic communication with the air water separator tank and the water recover and recirculating channel.

10. A fuel cell device as claimed in claim 7 wherein the water recovery and recirculation channel provides for the recovery and recirculation from the fuel cell back to the mixing chamber, of a remaining water and methanol mixture and reaction water collected from the water recovery and recirculating system.

11. A fuel cell device comprising:
    a base portion, formed of a singular body, and having a major surface, the base portion formed of a material selected from the group consisting of ceramic, plastic, glass, metal, and silicon;
    at least one fuel cell membrane electrode assembly formed on the major surface of the base portion, the at least one fuel cell membrane electrode assembly including a first electrode, a film formed of a protonically conductive electrolyte, and a second electrode;
    a fluid supply channel defined in the base portion and communicating with the at least one fuel cell membrane electrode assembly for supplying a fuel-bearing fluid to the at least one fuel cell membrane electrode assembly, the fluid supply channel further including at least one fluid inlet and a mixing chamber;
    an exhaust separation chamber communicating with the at least one fuel cell membrane electrode assembly, the exhaust separation chamber spaced apart from the fluid supply channel for exhausting gases from the at least one spaced apart fuel cell membrane electrode assembly;
    a water recovery and recirculation channel in fluidic communication with the exhaust separation chamber, and mixing chamber;
    a cap portion, including a water recovery and recirculating system, comprised of an air supplier, characterized as generating a forced air stream through a flow field, and across the at least one fuel cell membrane electrode assembly, and an gas-liquid separator in fluidic communication with the flow field and the water recovery and recirculation channel, in combination the base portion, the at least one fuel cell membrane electrode assembly, the cooperating fluid supply channel, cooperating exhaust separation chamber, the water recovery and recirculation channel and the cap portion forming a single fuel cell assembly system.

12. A fuel cell device as claimed in claim 11 further including a plurality of spaced apart fuel cell membrane electrode assemblies formed on the major surface of the base portion, thereby forming a plurality of fuel cell assemblies.

13. A fuel cell device as claimed in claim 12 wherein the plurality of fuel cell membrane electrode assemblies are electrically connected in one of a series electrical interface or a parallel electrical interface.

14. A fuel cell device as claimed in claim 11 wherein the first and second electrodes comprise a material selected from the group consisting of platinum, palladium, gold, nickel, tungsten carbide, molybdenum, ruthenium, and alloys or compounds of platinum, palladium, gold, nickel, tungsten carbide, molybdenum, ruthenium, or a catalyst material.

15. A fuel cell device as claimed in claim 11 wherein the at least one fuel cell membrane electrode assemblies each further include a gas diffusion layer positioned adjacent to the first and second electrodes.

16. A fuel cell device as claimed in claim 11 wherein the water recovery and recirculating system further includes a reverse osmosis type membrane in fluidic communication with the air water separator tank and the water recover and recirculating channel.

17. A fuel cell device as claimed in claim 11 wherein the water recovery and recirculating system further includes a direct fluidic communication with the air water separator tank and the water recover and recirculating channel.

18. A fuel cell device as claimed in claim 11 wherein the water recovery and recirculation channel provides for the recovery and recirculation from the fuel cell back to the mixing chamber, of a remaining water and methanol mixture and reaction water collected from the water recovery and recirculating system.

19. A fuel cell device as claimed in claim 11 wherein the air supplier characterized as generating a forced air stream is one of a piezoelectric pump, a diaphragm pump, a peristolic pump, a rotary air pump, or an electric fan.

20. A method of fabricating a fuel cell device comprising the steps of:
providing a base portion formed of a material selected from the group consisting of ceramic, plastic, glass, metal, and silicon;
forming at least one fuel cell membrane electrode assembly on a major surface of the base portion, the at least one fuel cell membrane electrode assembly including a first electrode, a film formed of a protonically conductive electrolyte, and a second electrode;
forming a fluid supply channel in the base portion for supplying a fuel-bearing fluid to the at least one fuel cell membrane electrode assembly, the fluid supply channel further including a mixing chamber and a methanol concentration sensor;
forming an exhaust separation chamber in the base portion, the exhaust separation chamber formed apart from the fluid supply channel for exhausting gases from the at least one spaced apart fuel cell membrane electrode assembly;
forming a water recovery and recirculating channel in fluidic communication with the exhaust separation chamber and mixing chamber
forming a cap portion including a water recovery and recirculation system for the recovery and recirculation of a remaining fuel-bearing fluid and a reaction water, the water recovery and recirculation system in fluidic communication with the water recovery and recirculating channel and the exhaust separation chamber;
forming the at least one fuel cell membrane electrode assembly on the major surface of the base portion, the step of forming the at least one spaced apart fuel cell membrane electrode assembly including the steps of providing for a first electrode on a major surface of the base portion, providing for a film formed of a protonically conductive electrolyte in contact with the first electrode, providing for a second electrode in contact with the film, the at least one spaced apart fuel cell membrane electrode assembly and the cooperating fluid supply channel, cooperating exhaust separation channel and water recovery and recirculation system forming a single fuel cell assembly system, the cap portion further including a plurality of electrical components for electrical integration of the formed fuel cell assembly.

21. A method of fabricating a fuel cell device as claimed in claim 20 wherein the step of forming the water recovery and recirculating system includes forming an air supplier characterized as generating a forced air stream across the at least one fuel cell membrane electrode assembly.

22. A method of fabricating a fuel cell device as claimed in claim 21 wherein the step of forming the water recovery and recirculating system further includes forming an gas-liquid separator in fluidic communication with the forced air stream and the water recovery and recirculating channel, and mixing chamber.

* * * * *